United States Patent
Fujita et al.

(10) Patent No.: US 11,196,487 B1
(45) Date of Patent: Dec. 7, 2021

(54) FREE-SPACE COMMUNICATION AND WIRELESS POWER TRANSFER SYSTEM AND METHOD OF USING SAME

(71) Applicant: SCIDATEK INC., Austin, TX (US)

(72) Inventors: Junichiro Fujita, Los Altos, CA (US); Tomoyuki Izuhara, Pleasanton, CA (US); Louay Eldada, Austin, TX (US)

(73) Assignee: SCIDATEK INC., Austin, TX (US)

( * ) Notice: Subject to any disclaimer, the term of this patent is extended or adjusted under 35 U.S.C. 154(b) by 0 days.

(21) Appl. No.: 16/944,228

(22) Filed: Jul. 31, 2020

(51) Int. Cl.
*H04B 10/114* (2013.01)
*H04B 10/50* (2013.01)
*H04B 10/69* (2013.01)
*H02J 50/30* (2016.01)

(52) U.S. Cl.
CPC .......... *H04B 10/1143* (2013.01); *H02J 50/30* (2016.02); *H04B 10/50* (2013.01); *H04B 10/69* (2013.01)

(58) Field of Classification Search
CPC .... H04B 10/1143; H04B 10/69; H04B 10/50; H02J 50/30
USPC ........................................................ 398/115
See application file for complete search history.

(56) References Cited

U.S. PATENT DOCUMENTS

| | | | | |
|---|---|---|---|---|
| 5,419,781 A | * | 5/1995 | Hamakawa | H01L 31/0445 136/244 |
| 7,078,666 B2 | | 7/2006 | Tuminen et al. | |
| 7,359,647 B1 | * | 4/2008 | Faria | H04B 10/807 398/171 |
| 7,941,022 B1 | * | 5/2011 | Schaffner | G02B 6/03633 385/127 |
| 9,318,905 B2 | | 4/2016 | Tsang | |
| 9,453,969 B2 | * | 9/2016 | Kobyakov | G02B 6/305 |
| 9,615,254 B2 | | 4/2017 | Lord et al. | |
| 9,755,745 B2 | * | 9/2017 | Beck | H04B 10/66 |
| 10,148,137 B2 | * | 12/2018 | Joyce | H02J 50/20 |
| 10,404,103 B2 | | 9/2019 | Alpert et al. | |
| 10,520,997 B2 | * | 12/2019 | Sen | H02J 50/001 |
| 10,637,278 B2 | * | 4/2020 | Diggins | H02J 7/35 |
| 10,715,252 B2 | * | 7/2020 | Leon-Salas | H01L 31/043 |

(Continued)

OTHER PUBLICATIONS

J. Fakidis et al, "Indoor Optical Wireless Power Transfer to Small Cells at Nighttime," J. Lightwave Tech, vol. 34, No. 13, pp. 3236-3258 (2016).

(Continued)

*Primary Examiner* — Abbas H Alagheband
(74) *Attorney, Agent, or Firm* — Pierson Intellectual Property LLC

(57) ABSTRACT

A system and method wherein electromagnetic radiation is used for free-space communication and wireless power transfer. The electromagnetic radiation used is preferably optical radiation. The optical free-space communication and wireless power transfer system includes an optical receiver device comprising an optical filter, a photodetector, and a photovoltaic cell, wherein a band of the incoming optical radiation is extracted by the optical filter and directed to the photodetector for communication data signal detection. The remaining optical radiation is converted by the photovoltaic cell into electrical power so that the harvested energy can be stored, used as the power source of the photodetector, or used as the power source of external devices.

12 Claims, 6 Drawing Sheets

(56) References Cited

U.S. PATENT DOCUMENTS

| | | | | |
|---|---|---|---|---|
| 2012/0141799 | A1* | 6/2012 | Kub | H01L 31/03925 |
| | | | | 428/408 |
| 2013/0202292 | A1* | 8/2013 | Sokolov | H04J 14/02 |
| | | | | 398/34 |
| 2015/0309261 | A1* | 10/2015 | Kobyakov | G02B 6/1228 |
| | | | | 385/14 |
| 2015/0326313 | A1* | 11/2015 | Brouillet | H04B 10/1129 |
| | | | | 398/131 |
| 2016/0134370 | A1 | 5/2016 | Huang et al. | |
| 2017/0093501 | A1* | 3/2017 | Meitl | H01L 31/043 |
| 2017/0160482 | A1* | 6/2017 | Frankel | G02B 6/30 |
| 2017/0184450 | A1* | 6/2017 | Doylend | G01S 7/4817 |
| 2017/0207600 | A1* | 7/2017 | Klamkin | H01S 5/142 |
| 2017/0328772 | A1* | 11/2017 | Wijbrans | G01J 3/12 |
| 2017/0346347 | A1* | 11/2017 | Abiri | H02J 50/50 |
| 2019/0064353 | A1* | 2/2019 | Nugent, Jr. | H02J 50/30 |
| 2019/0195688 | A1* | 6/2019 | Atabaki | G01J 3/433 |
| 2019/0229558 | A1* | 7/2019 | Pigeon | H02J 50/30 |
| 2019/0268073 | A1* | 8/2019 | Kasuga | H04B 10/2581 |
| 2020/0014252 | A1 | 1/2020 | Wan et al. | |
| 2020/0076506 | A1* | 3/2020 | Kim | H04B 10/1143 |
| 2020/0092012 | A1* | 3/2020 | Videv | H04B 10/69 |
| 2020/0227949 | A1* | 7/2020 | Abiri | H02J 50/30 |

OTHER PUBLICATIONS

Zhang et al, "Efficient silicon Nitride grating coupler with distributed Bragg reflectors," Opt. Exp vol. 22, No. 18, pp. 21800-21805 (2014).

Rosenkrantz et al, "1550nm modulating retroreflector based on coated nanoparticles for free-space optical communication," Appl. Opt. vol. 54, No. 17, pp. 5309-5313 (2015).

\* cited by examiner

FREE-SPACE COMMUNICATION AND WIRELESS POWER TRANSFER SYSTEM AND METHOD OF USING SAME

FIELD OF THE INVENTION

The present embodiments generally relate to free space communication and wireless power transfer. A typical system of these embodiments includes at least one optical receiver to detect both communication data and power transferred through free space using electromagnetic radiation, and preferably optical radiation.

BACKGROUND

With recent advancements in wireless technology, mobile devices have become ubiquitous in home and businesses. New technologies such as 5G cellular networks and Internet of Things (IoT) further expand the range of wireless applications. Because of the large number of devices in the field, and the vast amount of data exchanged, it is increasingly challenging to accommodate the bandwidth demands of all wireless applications. Recently, there has been a strong interest in the use of optical spectrum for wireless communications to support the large demand for wireless data communication bandwidth. This technology is often called free-space optical communication (FSO). The optical spectrum has numerous benefits over other spectrum ranges, with one of the most significant advantages being a much larger available bandwidth, especially compared to the conventional radio frequency (RF) spectrum. Further, the optical spectrum is less regulated, which allows a lower cost of usage. Since optical radiation does not penetrate an opaque material, it is a safe medium for secure communication links. Furthermore, optical communication has been used for long-haul high-speed data links via optical fiber networks. Given the increasing demand for bandwidth, and the pros and cons of various communication methods, it is inevitable that optical methods will be a major part of free-space data communication networks in the near future.

Wireless power transfer over a moderate distance, for example in the range of few to tens of meters, is considered one of the key technologies for further advancement of the mobile and IoT devices discussed above. By eliminating the need to wire or to replace the battery of each device, the potential applications and environments where these devices can operate can be expanded greatly. Wireless power transfer is traditionally implemented or studied with magnetic methods such as magnetic inductive coupling and magnetic resonant coupling. These methods are commonly used when the distance between the energy source and the receiving device is short. For example, electrical toothbrushes are often rechargeable via magnetic inductive coupling, wirelessly. Although these methods can transfer a reasonable amount of energy wirelessly, the distance is limited. Another method to transfer energy wirelessly is electromagnetic waves. The various spectrum ranges of such media possess pros and cons for energy transfer purposes. For example, a traditional method for WPT, one that operates in the radio frequency (RF) spectrum range, has the potential to operate over a long distance. Lord (U.S. Pat. No. 9,615,254), Joyce (U.S. Ser. No. 10/148,137) and Sen (U.S. Ser. No. 10/520,997) proposed systems of WPT based on RF signals. However, due to the longer wavelength, the RF beam cannot be focused to a spot size on the order of millimeters, as is needed for the active detection area of mobile devices such as mobile phones. The focus of the present embodiments is on the optical spectrum for wireless energy transfer, often called optical wireless power transfer (OWPT). Having smaller wavelength compared to the RF counterpart, OWPT can focus the energy-carrying beam into a small spot, as described by Fakidis et al, and yet it can transfer the energy for a long distance. Because of this ability, the energy transfer efficiency is much higher for OWPT compared to other long-range transfer methods for smaller devices. For this reason, OWPT is used in the present embodiments as a suitable option for wireless power transfer to mobile and IoT devices.

The present embodiments enable the integration of these two crucial functions (FSO and OWPT) into a single optical receiver system. Since both FSO and OWPT utilize the optical spectrum, the same media are used to carry both energy and data between devices. By combining and integrating these functions together, much smaller size, low power consumption, and lower cost devices are possible.

Tsang (U.S. Pat. No. 9,318,905) taught a system of an optical charging device based on a plurality of light sources. This system requires the power-receiving device to be in proximity to the charging system and does not relate to any communication function of the device. Wan (US2020/0014252) and Alpert (U.S. Ser. No. 10/404,103) describe wireless charging devices based on optical signals, but the communication they describe is limited to the transmitter, and the receiver and does not go beyond the purpose of wireless power transfer.

There were other attempts to combine the FSO and OWPT functions together in one system. For example, Tuminen (U.S. Pat. No. 7,078,666) utilizes the optical spectrum for both energy and data transmission, however each function is carried out by separate sources and detectors. In that case, this type of configuration is merely a parallel operation of FSO and OWPT implemented in separate device pairs. In such a system, the efficiency of optical power utilization is lower, the size is larger and the cost is higher.

Huang (US2016/0134370) proposes a system of optical communication as well as optical power transfer possibly with a single source, and divides the optical radiation into a communication signal and a power radiation. Again, the efficiency of optical power utilization is limited as the communication signal and power radiation are treated separately.

Other attempts tried to share a single optical channel for both FSO and OWPT. For example, Kim (US2020/0076506) combines FSO and OWPT spectra at the emitting apparatus, however the receiving apparatus' detectors for energy and data signal receive the mixed optical radiation. This configuration also reduces the efficiency of the utilization of the available energy.

In the present embodiments that utilize integration, seamless and lossless optical spectra, and energy sharing between the data and the energy detectors, nearly perfect utilization of the received optical energy is achieved.

SUMMARY

The present embodiments achieve the ability to detect in the same system both communication signals and power radiation transferred through free space. It consists of a filter that extracts at least one optical signal at a wavelength band used for communication, and converting said at least one optical signal into at least one electrical signal by at least one photodetector and processing them for operating at least one external device such as a sensor. The remaining optical radiation is used for power transfer, and converted into electrical power that can be used for (a) energy storage, (b) operating said at least one photodetector of said at least one communication signal, and/or (c) operating an external device. The filtering function may be achieved by a waveguide grating based on the mature Complementary Metal-Oxide-Semiconductor (CMOS) process. Said grating is preferably designed in such a way that it substantially matches the mode of the upstream optical signal transmitter as well as said communication wavelength band, so as to minimize the background noise coupled into the waveguide and processed by the system as part of the communication signal. The waveguide grating is located directly on top of a photovoltaic cell so that the remaining power, including the uncoupled part of the communication signals due to the coupling efficiency of the waveguide grating, will be collected as the power radiation.

DESCRIPTION OF THE DRAWINGS

The following drawings are illustrative of the present embodiments and are not intended to limit the embodiments as encompassed by the claims forming part of the application.

The schematic diagram of FIG. 1 shows the basic configuration of the optical receiver for data and power transmission, which comprises an optical filter 101, a photovoltaic cell 102, and a photodetector 103. The optical radiation from the emitter is shown as an aggregate 104, a filter-selected data portion 105, and a power portion 106. A spectral view 107 of the optical radiation is also shown.

Figure 2:
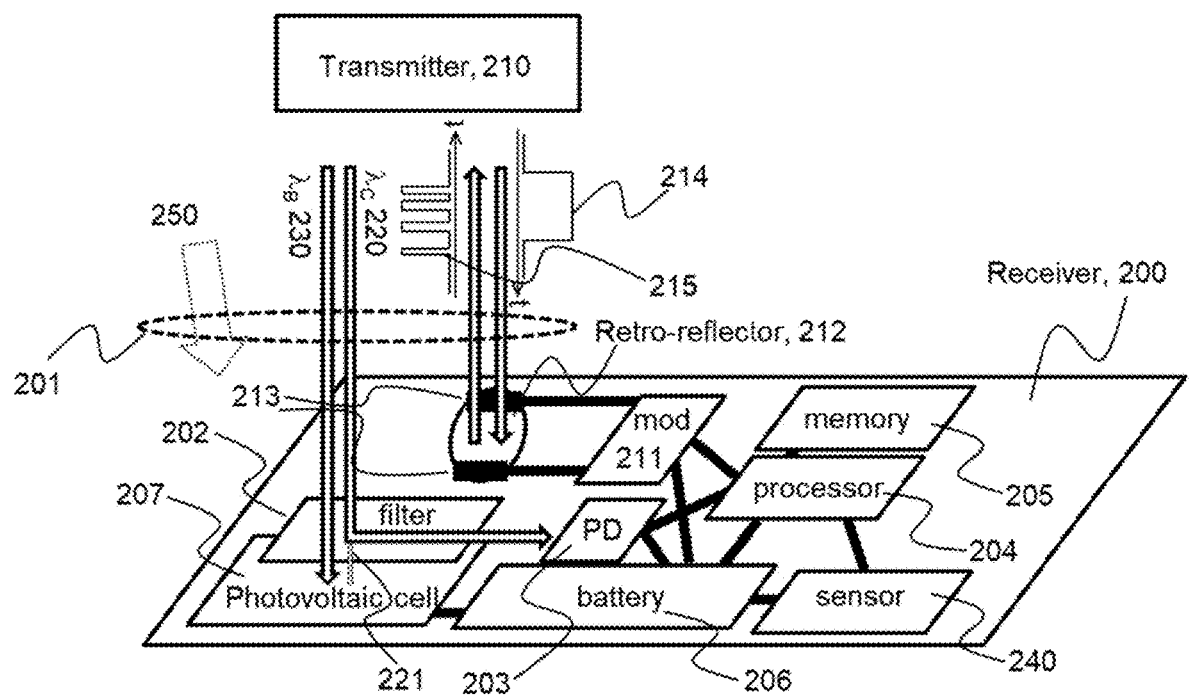

The schematic diagram of FIG. 2 shows an example configuration of the FSO and OWPT system using the optical receiver. This exemplary system includes additional elements such as a battery 206, a processor 204, and a sensor 240 for potential wireless device applications.

Figure 3:
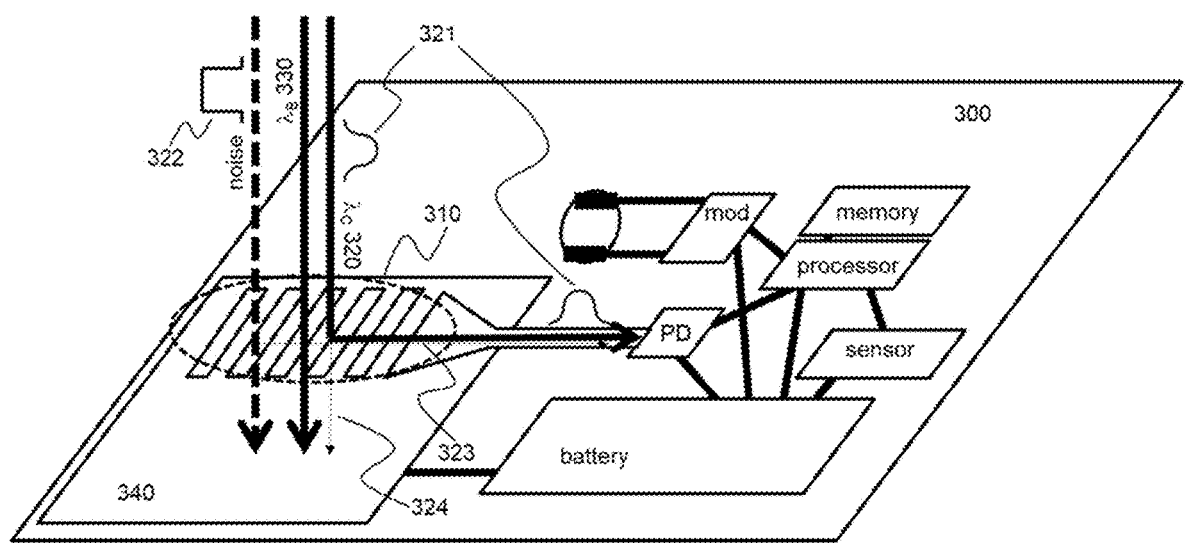

The schematic diagram of FIG. 3 shows an example implementation of the optical receiver utilizing photonic-integrated-circuit-based waveguide grating structure 310.

Figure 4:
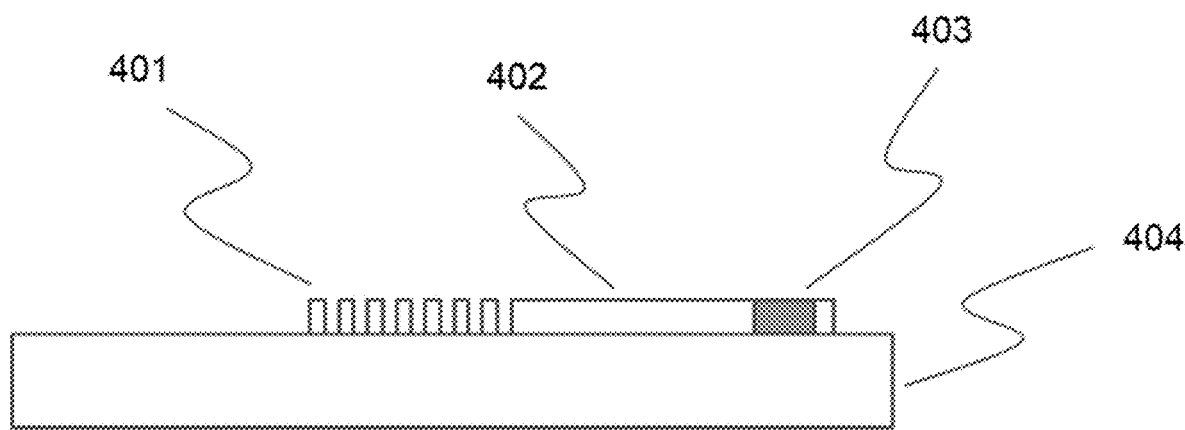

The schematic diagram of FIG. 4 shows an example integration of the optical receiver utilizing a photonic-integrated-circuit-based optical filter 401 and a photodetector 403 fabricated on a photovoltaic cell surface 404.

Figure 5:
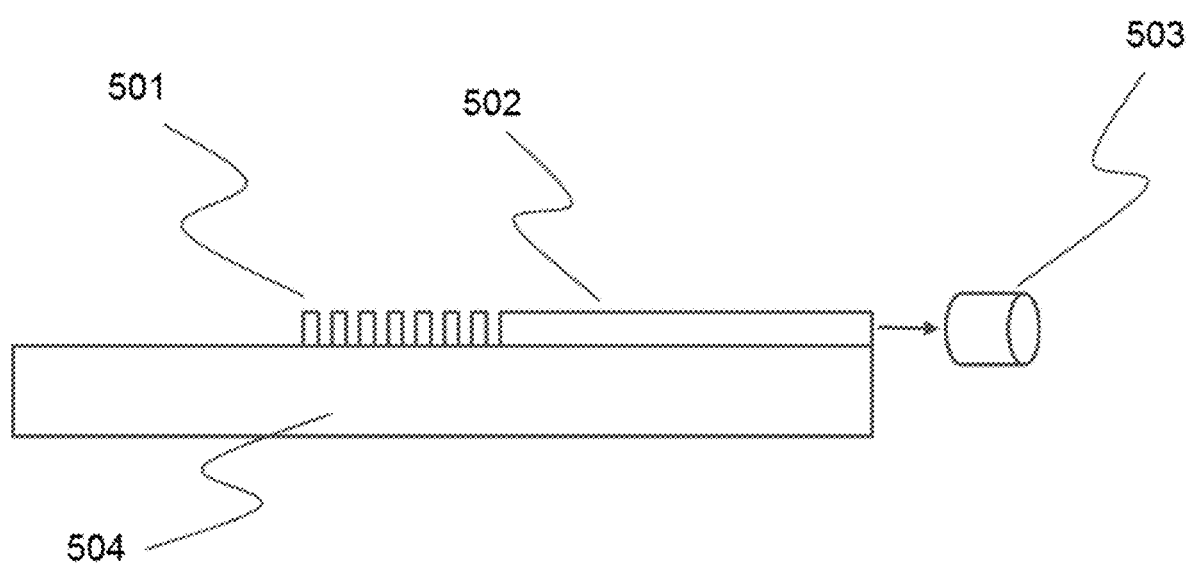

The schematic diagram of FIG. 5 shows an example integration of the optical receiver utilizing photonic-integrated-circuit-based 501 optical filter fabricated on a photovoltaic cell surface 504, and a discrete photodetector 503.

Figure 6:
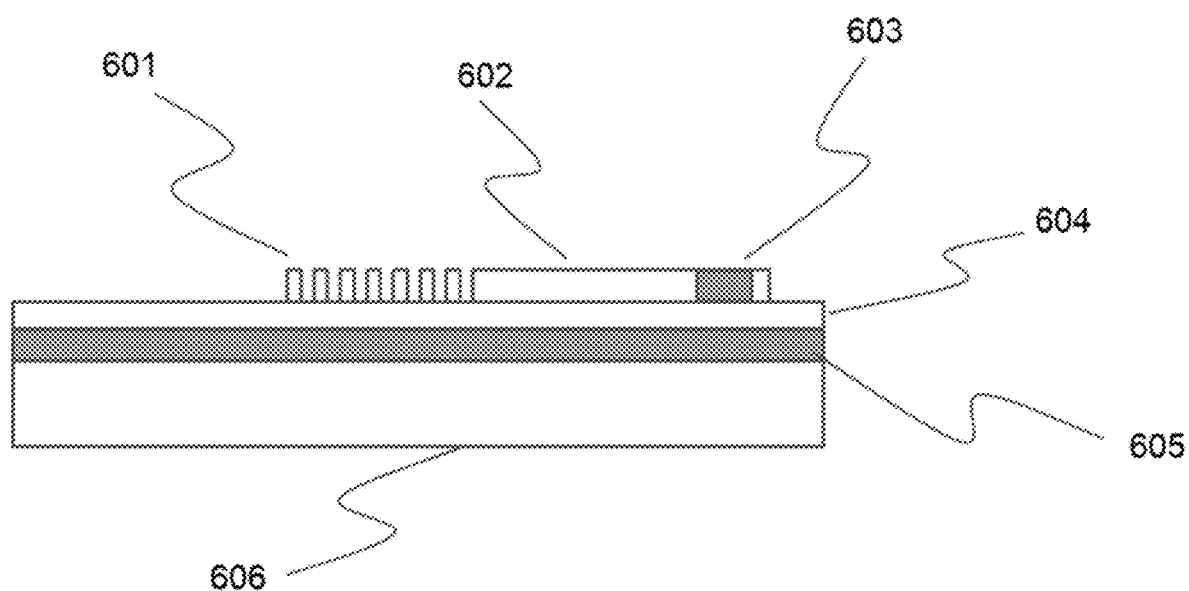

The schematic diagram of FIG. 6 shows an example of hybrid integration of the optical receiver utilizing a separately fabricated photonic integrated circuit substrate 604 bonded onto the surface of a photovoltaic cell 606 using an adhesive layer 605.

DETAILED DESCRIPTION

Figure 1:
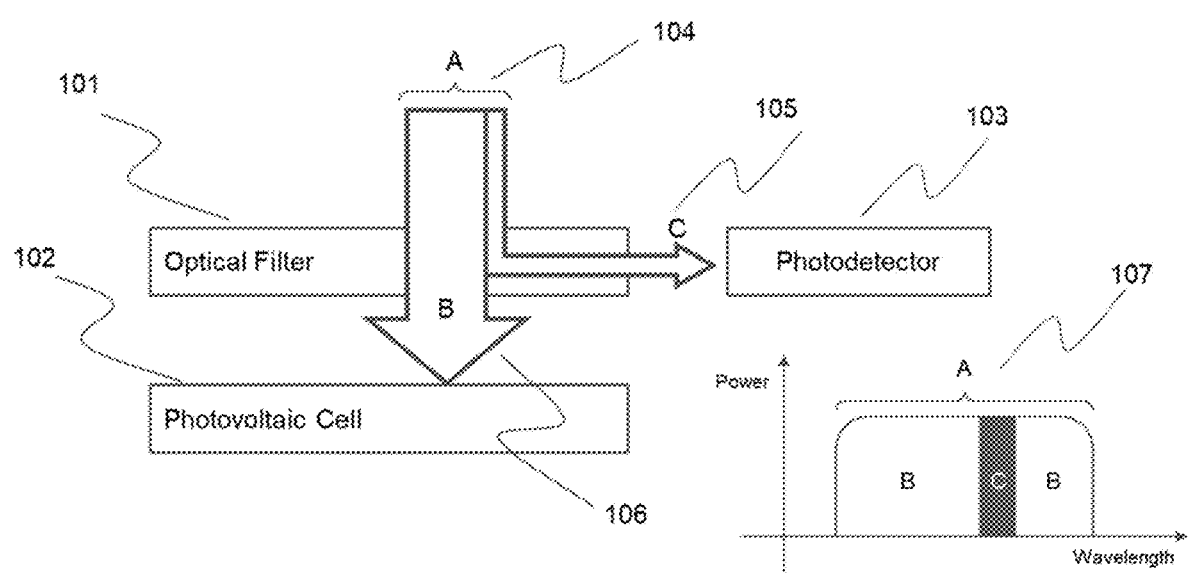

A system comprising at least one novel optical receiver for both free-space data communication and wireless power transfer is described below. An overview of the receiver configuration is shown in FIG. 1. The receiver comprises an optical filter 101, a photovoltaic cell 102, and a photodetector 103. The optical radiation 104 coming from a transmitter includes a data signal portion 105 for communication, and an energy-carrying portion 106. The total optical radiation coming into the receiver 104 including the two portions described above and the background radiation from the environment and other devices. Said optical filter selectively extracts a wavelength band and directs the extracted portion and the balance of the optical radiation to two separate directions without causing much loss of energy by absorption or reflection, as shown in the spectral view 107. In said receiver, the wavelength band including the data signal is directed to said photodetector for data signal acquisition and the balance of the radiation is directed to said photovoltaic cell. The configuration of this receiver enables efficient usage of optical power since any optical energy not coupled to said photodetector is coupled to said photovoltaic cell. Nearly full utilization of the incoming optical energy is utilized either in data format or in energy format. The optical radiation coming from the transmitter to the receiver 104 can be directed by mechanical beam steering means or by solid state electronic beamforming, as in the use of an optical phased array (OPA).

In a structure similar to the one shown in FIG. 1 for wireless data and power transmission, said photodetector may be placed on top of said photovoltaic cell directly. This structure typically has lower energy efficiency since the photodetector blocks the entire optical radiation coming into the area that the photodetector covers. The optical energy portion not useful for data detection is wasted. Furthermore, such optical energy is a harmful noise for the data detection and degrades the signal-to-noise ratio at the data photodetector. It is possible to use a filter before such a photodetector to avoid said degradation in the signal-to-noise ratio, but again the power transmission portion of the energy directed toward the data photodetector is lost by absorption or reflection by the filtering function.

An example FSO and OWPT system utilizing said at least one optical receiver based on the present embodiments is depicted schematically in FIG. 2. The optical receiver, 200, works with at least one optical transmitter 210 which sends optical signals. The optical receiver, 200, comprises an opening area, 201, where light optical signals can enter and exit, a filter, 202, a photodetector, 203, a signal processor, 204, a memory subsystem, 205, a battery subsystem, 206, and a photovoltaic cell, 207. In addition, it may also have a means to transmit optical communication signals to the optical transmitter, 210, with modulator, 211, and retroreflector, 212.

The optical radiation that originated from a transmitter, 210, has a wavelength band where, as explained above, a portion within the band is used as the communication signal, 220, while the rest of wavelength within the band is used as the power radiation, 230. The optical signal that enters the opening area of the optical receiver goes into the filter, 202, where the optical path is determined based on the wavelength. The operating wavelength of the filter, 202, is selected so that the communication signal, 220, is directed to the photodetector and is subsequently converted into an electrical signal. The electrical signal enters the signal processor, 204, to perform the proper operation based on the communication signal, 220. An example of the proper operation of the present embodiments involves sending an acknowledgement that the communication signal has been received, sending information on the amount of stored power in the battery, sending the stored data within the memory to the transmitter, 210, through the operation of a modulator, 211, and a retroreflector, 212. Another example of the proper operation of the present embodiments involves sending a command to a co-existing device which has a function outside of the optical receiver, such as sensor, 240, to perform its task.

Unlike the case of sending optical signals from the transmitter, 210, to the receiver, 200, the optical receiver may send the communication signal to the transmitter without a light source at the receiver side. One example of achieving this is to use a modulator, 211, and a retro-reflector, 212, as described by Rosenkrantz and Kim (US2020/0076506). A pair of electrodes, 213, that extend from the modulator, 211, are located on top of the retro-reflector, 212, with the electrodes facing the transmitter side. The optical signal from the transmitter, 210, enters the region within the pair of electrodes, 213, then the retro-reflector, 212. The retro-reflector, 212, reflects the optical signal back to the direction of the transmitter, 210 through the region within the pair of electrodes, 213. An example of modulating the optical signal is to perform time-dependent attenuation of the optical signal by electro-absorption across the pair of electrodes, 213. This way, the plain signal from the transmitter, 214, is modulated, 215, and is reflected back to the transmitter, 210, without any optical emitter at the receiver, 200.

The power level of the communication signal, 220, is typically smaller than that of the power signal, 230. Also, any presence of background noise, 250, may deteriorate the signal quality of the communication signal. For these reasons, the filter is designed so that only a small portion of the incoming optical wavelength band which includes the data signal is separated and coupled to the photodetector, 203. To optimize the signal-to-noise ratio at the photodetector, the optical filter adjusts the coupling of the undesired light resulting with a less than highest possible coupling efficiency of the communication signal, 220, at the filter, 202, and may lead to a small amount of communication signal into the photovoltaic cell, 207. With such a configuration, the communication signal 221 not collected at the photodetector is used as power radiation for energy purpose, maintaining high energy utilization.

The power signal, 230, enters the photovoltaic cell, 207, where light generates electron-hole pairs for electrical power generation. A mature type of device for the photovoltaic cell, 207, is a solar cell. Unlike the case of commonly-available solar cells to generate power from sunlight which needs to operate at the wide range of wavelength band from ultraviolet (UV) to infrared (IR) wavelength, the photovoltaic cell of the embodiments only needs to operate at the wavelength band of the optical power radiation, 230. Efficient power conversion efficiency is expected for the photovoltaic cell because the operating wavelength and its bandwidth can be designed according to the optimal band gap of a semiconductor material. In addition, the communication signal, 221, that is inevitably directed to the photovoltaic cell, 207, can be used as a power source by selecting its wavelength close enough to the wavelength of the power radiation, 230, for efficient power conversion at the photovoltaic cell, 207.

The generated power can be stored in the battery, 206, which can be used later as a power source of the photodetector, 203, processor, 204, memory, 205, and modulator, 211. The battery, 206, is useful especially if operation of the larger system requires similar or large power compared to the power that is transferred. If the system does not have a battery, the generated power is used immediately for the operations that require less power than the power transfer capacity. Since the communication signal, 220, is different from the power radiation, 230, in terms of wavelength, the simultaneous operation of communication and power transfer is possible.

A desirable implementation of the optical receiver of the present embodiments is through the integration of the device elements. One way to achieve this integration is by fabricating the device with the mature Complementary Metal-Oxide-Semiconductor (CMOS) process. The CMOS process is commonly used for electronic devices such as memory and processor. In addition, the materials for optical to electrical conversion, such as photodetector and solar cell, are available. Further, integrated optical devices, commonly known as Photonic Integrated Circuits (PICs), can be fabricated with the CMOS process.

One example of the optical receiver based on PICs is depicted in FIG. 3. The device can be fabricated on a substrate, 300, such as silicon where thin-film materials are deposited and patterned to realize optical and electronic devices. The filter of the embodiment can be made of a waveguide grating, 310, such as the design described by Zhang.

A waveguide grating is designed so that a portion of the incoming optical wavelength band can be coupled from the out-of-plane axis into a waveguide that is attached or in close proximity to said grating. The center wavelength of the filtered wavelength band is determined mostly based on the period of the waveguide grating at an incident beam angle. The width of the allowable wavelength band is determined mostly based on the refractive index contrast between the core and the cladding of the waveguide. Further, the coupling of the incident beam into the waveguide depends on the spatial mode, 321, of the incident beam. For the waveguide grating designed by Zhang, for example, the grating is designed to closely match the mode of the single-mode optical fiber. The waveguide grating of the embodiments is designed so that its mode closely matches the mode 321 of the optical signal from the transmitter. The design with mode matching to the mode originated from the transmitter results in lower background noise into the photodetector, 311, because only the mode-matched portion of the background noise, 322, as well as the wavelength band within the operating band of the grating can be guided into the waveguide, 323, for the photodetection. The reduction of noise in communication signals results in an improvement of the signal quality. In practice, there will be a small portion of communication signal uncoupled at the waveguide grating due to imperfect coupling. However, a substantial portion of the uncoupled light, 324, will enter the photovoltaic cell, 340, and be used as part of the power radiation for energy harvesting. With the integration of the device elements, higher performance, smaller form factor, and lower cost are expected.

The specification so far discusses optical receivers designed based on a continuous operating band, where a portion within the band is used for communication signals. The present embodiments however are not limited to the communication band being one band of the operating spectral range that includes the power radiation. For example, the communication band can be separated from the operating band of the power radiation. In this case, the transmitter may require two emitters, and only the emitter for the communication signal needs to be modulated.

Also, the waveguide grating can be designed for the ability to tune the communication wavelength band. The center wavelength of the waveguide grating depends on the refractive index of the waveguide material. It is known that the refractive index can be modified by, for example, the thermo-optic effect, the electro-optic effect, or the acousto-optic effect. One can use the effect to tune the wavelength band so that, when the communication signal is not needed, the wavelength of the waveguide grating is selected so that all of the incoming signal is directed into the photovoltaic cell.

The integration of the optical receiver in PIC format is considered in two levels. In the first level, the integration of the first photodetector is described. One option for the integration of the first photodetector is monolithic integration. For example, as depicted in FIG. 4, a waveguide type photodetector 403 is available in the CMOS process to integrate the photodetector on the same substrate with other PIC elements of the receiver, namely the waveguide grating 401 and waveguide 402. Then in the second level, the integration of the photovoltaic cell is considered. FIG. 4 depicts the monolithic integration of all the PIC elements onto the surface of the photovoltaic cell 404. FIG. 4 shows the full monolithic option.

In the first level integration, as depicted in FIG. 5, the photodetector can be a discrete component 503, assembled at the end of the waveguide 502 of the PIC substrate. In FIG. 5, 501 is the waveguide grating structure and 504 is the photovoltaic cell.

FIG. 6 depicts another embodiment of the second level of integration. Here, the PIC components are integrated onto a separate PIC substrate 604. Then, with an adhesive layer 605, the PIC substrate 604 and photovoltaic cell 606 is bonded together. The adhesive layer 605 must be transparent for the optical wavelength range used for the communication and power transfer purposes. An additional option is a PIC substrate without an integrated photodetector, which is replaced with a discrete photodetector component.

Numerous potential applications are enabled by the present embodiments. One example is a wearable medical monitoring device. Patients wear a small device equipped with the optical receiver described here in a healthcare building and healthcare providers monitor the conditions of patients, for example the body temperature, continuously and wirelessly, and offers the possibility to monitor the location of patients. Such devices will make it possible to monitor patient conditions closely and make more data available for doctors to analyze and to diagnose accurately in a timely manner. Furthermore, the wireless nature of the device increases the comfort of wearing it and the patients do not need to recharge the device regularly since it is recharged wirelessly automatically.

Another application is a high-speed data link to a mobile device. Since the optical spectrum used here has much wider bandwidth, it is possible to operate a high-speed data link with the optical receiver described here. The filtering function of the first filter makes the signal-to-noise ratio for data detection higher. The optical signal suffers less severe interference issues. These characteristics make the optical high-speed data link a stable communication channel. Additionally, the optical data link is a secure link within a room or area surrounded by opaque walls, windows and doors since the optical signal used here does not penetrate these materials. The supplied energy by the OWPT function makes the FSO module a very low power consumption device if not zero from the mobile device point of view—this is one of the most important properties of a mobile device. Examples of such mobile devices include a mobile phone, a tablet, a wrist watch, earphones, smart cards, AR/VR units, etc.

Another application is IoT sensory devices. In IoT systems, often sensor networks are utilized to collect a large amount of data wirelessly. For example, smart buildings use temperature sensors in various locations throughout the building to monitor the temperatures and to control the heating and cooling efficiently. For such devices, the optical receiver described here supplies both data and power so that users have a freedom to place the sensors at locations where it would be difficult to install power and data cables. OWPT also keeps the devices always charged so that the maintenance of the sensor network is low.

What is claimed is:

1. An electromagnetic free-space communication and wireless power transfer system comprising:
    at least one receiver configured to receive a communication signal formed of optical radiation with communication data within a first wavelength and a power signal within a second wavelength over free air utilizing free-space optical communication;
    an optical filter configured to extract a first portion from the first wavelength of the received optical radiation;
    a photodetector configured to receive the first portion from the optical filter for the communication data signal detection;
    a photovoltaic cell configured to receive a second portion from the optical filter and the power signal, the photovoltaic cell being configured to convert the second portion of the first wavelength into electrical current, the second portion of the optical radiation including a remainder of the first wavelength that was not extracted by the optical filter, the first portion being embedded within the second portion before the optical filter extracts the first portion.

2. The system in claim 1, wherein said optical filter utilizes a photonic integrated circuit grating structure.

3. The system in claim 2, wherein said photodetector utilizes an integrated semiconductor photodetector fabricated in close proximity to said grating structure, or connected to said grating structure via a filler material of an effective refractive index whose value is between those of said grating and said photodetector, or connected to said grating structure via a waveguide structure on the same photonic integrated circuit semiconductor substrate.

4. The system in claim 3, wherein said photonic integrated circuit is fabricated on an individual substrate and then bonded on top of said photovoltaic cell surface.

5. The system in claim 2, wherein said photodetector utilizes a discrete photodetector assembled in close proximity to said grating structure, or connected to said grating structure via a filler material of an effective refractive index whose value is between those of said grating and said photodetector.

6. The system in claim 2, wherein said photonic integrated circuit grating structure is configured to tune said band of said filtered signal.

7. The system in claim 1, wherein said photovoltaic cell utilizes a semiconductor photovoltaic cell.

8. The system in claim 7, wherein said photonic integrated circuit is integrated on top of said semiconductor photovoltaic cell.

9. The system in claim 1, further comprising an optical lens system placed in front of said optical filter or between any two elements from the set consisting of said optical filter, photodetector, and photovoltaic cell.

10. The system in claim 1, further comprising an optical amplifier placed between the optical filter and the photodetector.

11. A method of receiving data and energy optically utilizing an optical receiver comprising an optical filter, a photodetector and a photovoltaic cell, comprising steps of:
    sending, via an emitter, communication data signals within a first wavelength and energy in the first wavelength in optical radiation and a power signal within a second wavelength toward an optical receiver over free air utilizing free-space optical communication;
    receiving, by the optical receiver, the optical radiation;
    extracting, via the optical filter, a first portion in a first band of the first wavelength including communication data without significantly affecting a second portion in a second band of the first wavelength;

directing the communication data signals to the photodetector, and directing the second portion of the optical radiation to the photovoltaic cell, wherein the optical filter is a spectral filter;

converting, via the photodetector, the received optical communication in the first band data signals to electrical data signals;

converting, via the photovoltaic cell, the second portion of the optical radiation in the second band and the power signal to electrical energy, and the first portion of the received optical radiation is separated from the second portion of the optical radiation before the second portion of the optical radiation in the second portion is converted to electrical energy, the second portion of the optical radiation including a remainder of the first wavelength that was not extracted by the optical filter, the first portion being embedded within the second portion before the optical filter extracts the first portion.

12. The method in claim 11, further comprising:

amplifying the optical communication data signal separated by said optical filter before entering said photodetector.

* * * * *